Dec. 1, 1970  G. E. CONTRERAS ET AL  3,544,137
BALL JOINT FOR FLUID LINES

Filed Jan. 17, 1969  2 Sheets-Sheet 1

INVENTORS.
Gilbert E. Contreras,
BY Ronald H. Nystrom.

Jerry K. Harness
ATTORNEY.

Dec. 1, 1970  G. E. CONTRERAS ET AL  3,544,137
BALL JOINT FOR FLUID LINES
Filed Jan. 17, 1969  2 Sheets-Sheet 2
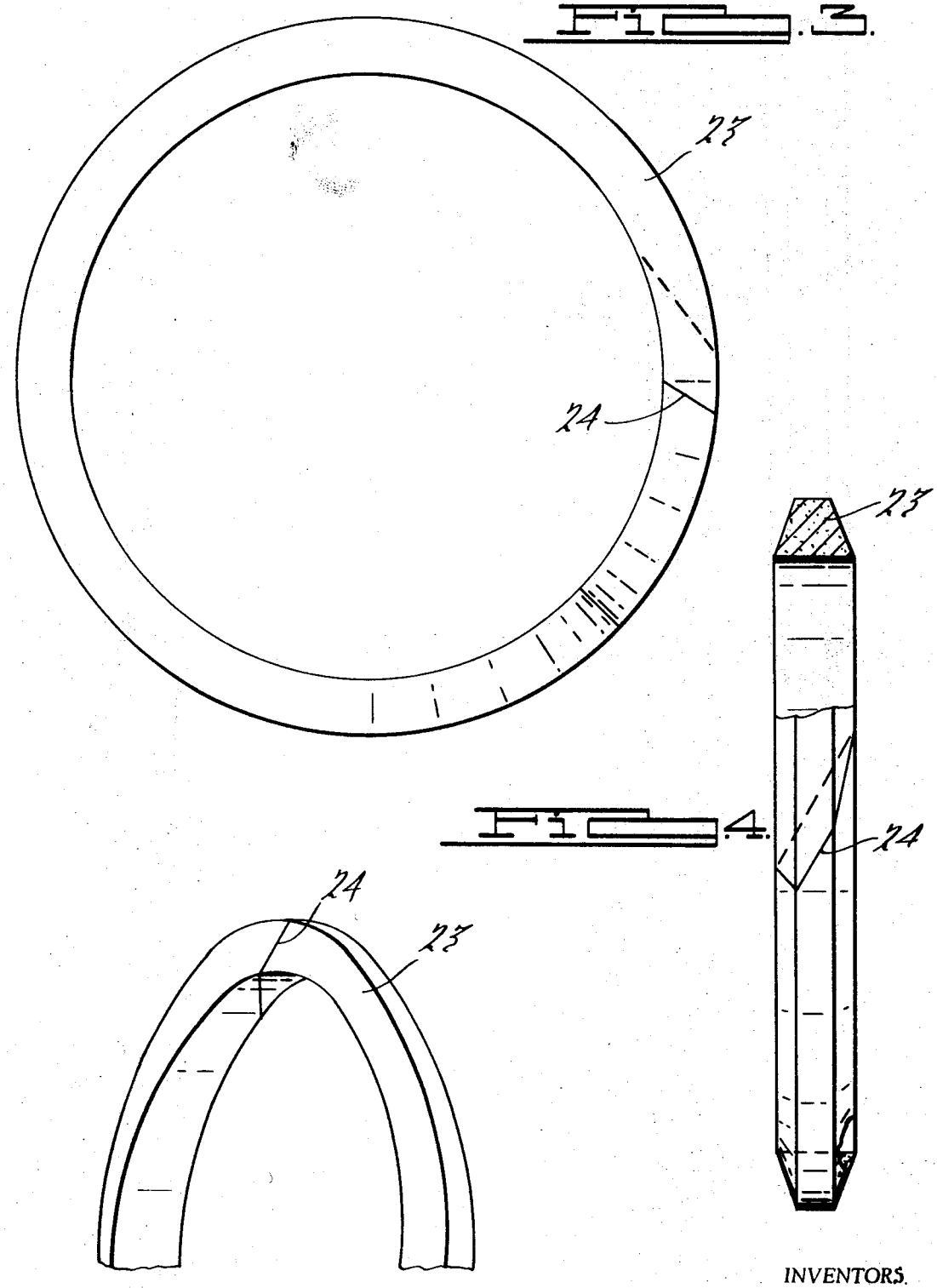
INVENTORS.
Gilbert E. Contreras,
BY Ronald H. Nystrom.
Jerry K. Harness
Their ATTORNEY.

United States Patent Office 3,544,137
Patented Dec. 1, 1970

3,544,137
BALL JOINT FOR FLUID LINES
Gilbert E. Contreras, Los Angeles, and Ronald H. Nystrom, Canoga Park, Calif., assignors to Aeroquip Corporation, Jackson, Mich.
Filed Jan. 17, 1969, Ser. No. 791,925
Int. Cl. F16l 27/04
U.S. Cl. 285—261        4 Claims

ABSTRACT OF THE DISCLOSURE

A ball joint comprising interfitting ball and socket members, a retainer of partially spherical shape, a gasket between flanges on the socket member and retainer, and a clamping ring drawing together the socket member and retainer flanges against the gasket so as to force the latter against the ball member. A double bias scarf cut on the gasket permits both radial and circumferential adjustment of the gasket while preventing leakage.

BACKGROUND OF THE INVENTION

Field of the invention

The invention relates to low pressure fluid lines, and more particularly to sheet metal ball joints for use in such lines to permit angular and torsional adjustment thereof. The invention is particularly adapted for installations subjected to high temperatures where it is desired to minimize leakage of the fluid.

Description of the prior art

One typical low pressure ball joint now in use consists of two tubes having interfitting ball and socket portions. This type of joint has no means for preventing leakage between the ball and socket surfaces. It is difficult to prevent leakage in such joints without making the metal-to-metal contact so tight as to interfere with free bending of the joint without metal galling and seizure. Such joints have a tendency to loosen after being subjected to cyclic temperature relations or to vibration. If the joint is being used in confined areas, excessive leakage of exhaust gases or similar toxic vapors could be fatal to personnel.

Another type of joint uses a polished spherical ball, a machined casing, two gaskets and a retaining flange or nut. Such parts however are expensive and are only used in highly sophisticated equipment such as certain steam line instalations.

SUMMARY OF THE INVENTION

According to the invention, the joint comprises two tubular members having interfitting ball and socket portions of partially sperical shape. A retainer also has a partly spherical shape and overlaps a portion of the ball. The retainer and socket have facing flanges between which is disposed an annular gasket. An annular clamping member overlaps the two facing flanges, and the parts are so shaped that when this clamping member is drawn tight, the flanges will be squeezed together against the gasket, wedging it downwardly against the ball to prevent leakage. The mating ends of the gasket have a scarf cut on a double bias so that adjustment of the gasket to prevent leakage may take place both radially and circumferentially. Other types of gaskets such as O-rings and nylon rings could also be used.

The ball joint of the present invention is of light weight and low cost construction, offering a compact shape while still maintaining minimum leakage even at high temperatures. There is very little metal-to-metal contact in the joint, thus minimizing frictional wear and enhancing the life of the unit. The clamping device permits tightening of the seal as it wears. Since there is a minimum of metal-to-metal contact, the unit will last indefinitely, only requiring seal replacement at periodic intervals. The force needed to bend the joint is less than in the above described conventional type of metal-to-metal ball joint. Furthermore, since the parts may be disassembled and the ball and socket separated, the joint may be used as a connector, thus simplifying installation and servicing of fluid lines.

BRIEF DESCRIPTION OF THE DRAWINGS

FIG. 3 is a side elevational view of the gasket;
FIG. 4 is an end elevational view thereof;
and
FIG. 5 is a partial perspective view thereof.

DESCRIPTION OF THE PREFERRED EMBODIMENT

Figure 1:
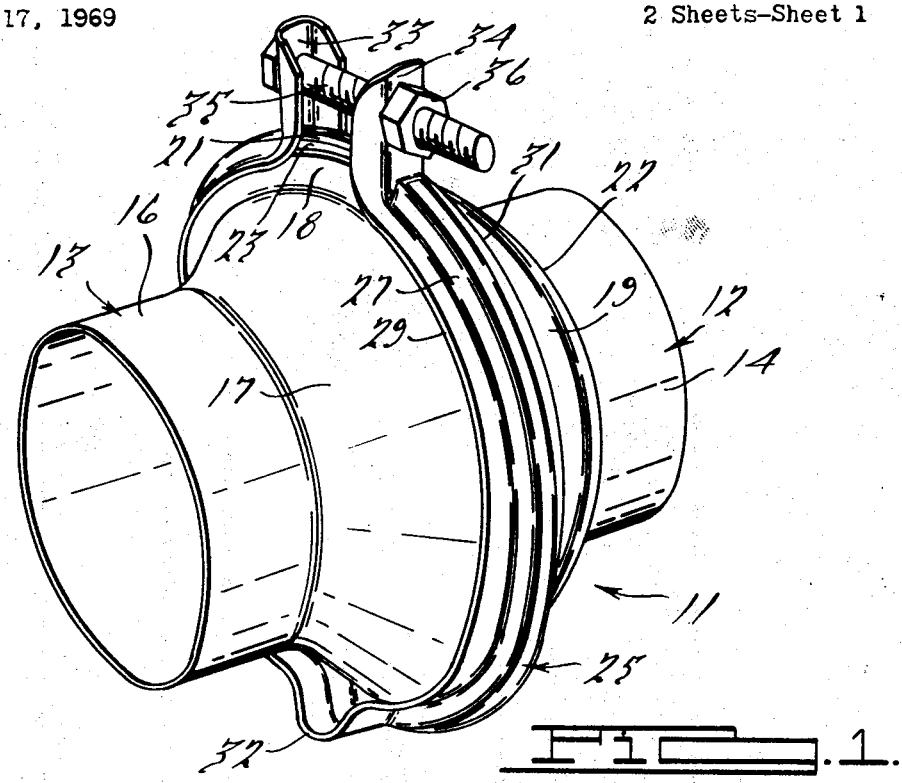
FIG. 1 is a perspective view of the ball joint.

The joint is generally indicated at 11 and comprises a ball member generally indicated at 12 and a socket member generally indicated at 13. Ball member 12 has a tubular portion 14 and a partially spherical portion 15, the spherical portion bulging outwardly from the tubular portion and then curving part way back to a smaller diameter.

Socket member 13 comprises a tubular portion 16 and a partially spherical portion 17 the inner surface of which has substantially the same radius of curvature as the outer surface of portion 15. Portion 17 however, does not extend fully to the maximum diameter, but instead has an outwardly extending flange 18 which is inclined away from portion 17.

A retainer 19 is provided, this retainer being a relatively short annular piece with its inner surface having the same radius of curvature as the outer surface of ball portion 15. Retainer 19 rests on ball portion 15 and has a flange 21 which extends outwardly and inclined away from member 19. The outer edge 22 of member 19 is bent slightly away from the surface of ball 15 to prevent undue friction and to act as a stop when the joint is bent.

Figure 2:
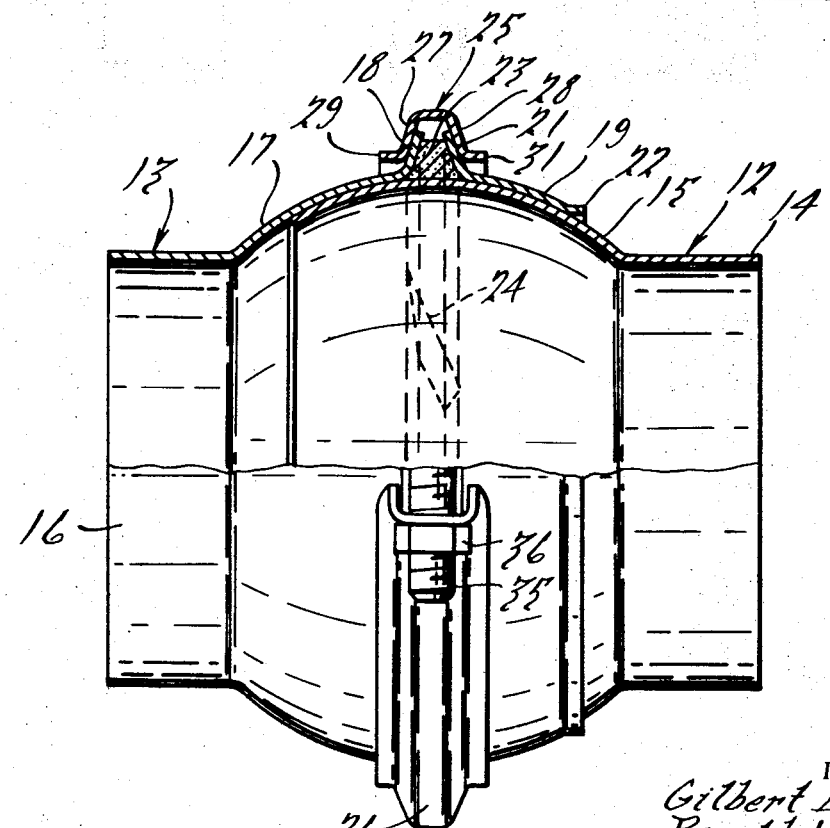
FIG. 2 is a partially sectioned view in elevation thereof.

A gasket 23 is disposed between the flanges 18 and 21. This gasket may be formed of any suitable material such as asbestos carbon graphite, and is wider at the base than at the top, as seen in FIGS. 2 and 4. The abutting ends 24 of gasket 23 have a scarf cut on double bias, as seen in FIGS. 3, 4 and 5.

A clamping ring generally indicated at 25 surrounds flanges 18 and 21, this ring having a central web 26, a pair of side walls 27 and 28, and outwardly extending flanges 29 and 31 extending from walls 27 and 28 respectively. The central portion 32 of ring 25 is flattened, as seen in FIG. 1, to provide a spring-like portion which tends to urge the two halves of the ring apart. The ring has two upstanding bolt receiving posts 33 and 34 which have apertures receiving a bolt 35 therethrough. This bolt has a nut 36 which, when tightened, will draw together posts 33 and 34. This will cause a wedging action of walls 27 and 28 against inclined flanges 18 and 21, pulling the flanges more tightly against gasket 23, and creating a radially inward force on the gasket tending to tighten it against ball portion 15. Clamping ring 25 will thus unite members 13, 19, 23 and 25 into a unitary assemblage capable of being deflected with respect to ball member 12 by the exertion of lateral forces on members 12 and 13. Although a clamping ring of the type shown is desirable, other types of clamps such as a bolted ring or a threaded ring and nut could also be used.

In operation, fluid flows through members 12 and 13 will not leak through the ball joint since it will be stopped by gasket 23 pressing against flanges 18 and 21 as well as ball portion 15. This will not interfere with bending of the ball joint since there need be very little metal-to-metal contact. After some use, should gasket 23 be worn, it may be drawn more closely against ball portion 15 by tightening nut 36. The limit of deflection of the ball joint will be engagement of tubular portion 14 of member 12 with flange 22 of retainer 19.

The double biased scarf joint of gasket 23 will permit its continued adjustment without permitting leakage past the abutting gasket ends. Should gasket 23 become worn, it is merely necessary to loosen nut 36, permitting posts 33 and 34 to spread apart, and slide ring 25 out of the way to permit withdrawal of retainer 19 so that gasket 23 may be removed and replaced. Similarly, the parts may be disassembled in order to use the joint as a connector for two parts of the fluid line.

We claim:

1. In a ball joint of sheet metal components, a ball member having a tubular portion and partially spherical portion bulging out from the tubular portion and then curving inwardly, a socket member having a tubular portion and a partially spherical portion receiving the inwardly curving ball member portion, an annular retainer disposed around the outwardly bulging spherical portion of said ball member and juxtaposed the end of said spherical portion of said socket member, outwardly extending facing flanges on said retainer and said partially spherical portion of said socket member inclined toward each other, a gasket disposed between said facing flanges, said gasket having opposed sloping faces each being substantially parallel to its adjacent flange, said sloping faces of said gasket preventing said flanges from contacting each other, and an adjustable clamping ring surrounding said flanges and having portions engageable with said flanges wherein clampingly adjusting said ring urges said flanges against said gasket and said gasket against said ball member wherein a seal is provided between said ball and socket members and the spherical portions thereof are aligned relative to each other.

2. The subject matter of claim 1 wherein said gasket has a generally frustoconical cross-sectional configuration.

3. The subject matter of claim 1 wherein said gasket has an asbestos content to accommodate high temperatures and a scarf cut on a double bias to aid adjustment.

4. The subject matter of claim 1 wherein said annular retainer is of a partialy spherical shape.

References Cited

UNITED STATES PATENTS

| | | | |
|---|---|---|---|
| 300,332 | 6/1884 | Schmidt | 285—261 |
| 664,143 | 12/1900 | Garlock | 277—216 |
| 2,541,205 | 2/1951 | Christophersen | 285—367 X |
| 2,709,094 | 5/1955 | Polanski | 285—407 |
| 2,846,244 | 8/1958 | Parker | 285—409 |
| 2,877,071 | 3/1959 | Arnot | 277—216 X |
| 2,897,569 | 8/1959 | Kastner | 24—279 |

FOREIGN PATENTS 66,789 7/1913 Switzerland.

DAVE W. AROLA, Primary Examiner

U.S. Cl. X.R.

277—216; 285—367, 424